United States Patent
Fujita et al.

(10) Patent No.: US 7,931,203 B2
(45) Date of Patent: Apr. 26, 2011

(54) NON-CONTACT TYPE IC CARD

(75) Inventors: Minoru Fujita, Tokyo (JP); Haruhiko Osawa, Tokyo (JP); Hajime Tsushio, Tokyo (JP); Akiko Nagumo, Tokyo (JP)

(73) Assignee: Kyodo Printing Co., Ltd, Tokyo (JP)

( * ) Notice: Subject to any disclaimer, the term of this patent is extended or adjusted under 35 U.S.C. 154(b) by 430 days.

(21) Appl. No.: 12/092,205

(22) PCT Filed: Nov. 14, 2006

(86) PCT No.: PCT/JP2006/322677
§ 371 (c)(1),
(2), (4) Date: Apr. 30, 2008

(87) PCT Pub. No.: WO2007/058179
PCT Pub. Date: May 24, 2007

(65) Prior Publication Data
US 2009/0250521 A1    Oct. 8, 2009

(30) Foreign Application Priority Data

Nov. 16, 2005 (JP) ................. 2005-331965
Dec. 8, 2005 (JP) ................. 2005-355448
Oct. 17, 2006 (JP) ................. 2006-282819

(51) Int. Cl.
*G06K 19/00* (2006.01)
(52) U.S. Cl. ........ 235/488; 235/491; 235/492; 235/493; 726/20
(58) Field of Classification Search .............. 235/488, 235/491, 492, 493; 726/20
See application file for complete search history.

(56) References Cited

U.S. PATENT DOCUMENTS

| | | | | |
|---|---|---|---|---|
| 4,956,243 A | * | 9/1990 | Miyake et al. | 428/823.1 |
| 5,053,611 A | * | 10/1991 | Takahashi et al. | 235/454 |
| 5,378,887 A | | 1/1995 | Kobayashi | |
| 5,379,131 A | | 1/1995 | Yamazaki et al. | |
| 5,486,933 A | | 1/1996 | Shindo et al. | |
| 2003/0065938 A1 | * | 4/2003 | Kitamura et al. | 713/200 |
| 2004/0245346 A1 | * | 12/2004 | Haddock | 235/492 |
| 2005/0062394 A1 | * | 3/2005 | Ito et al. | 313/461 |
| 2005/0104509 A1 | * | 5/2005 | Yamashita | 313/503 |

(Continued)

FOREIGN PATENT DOCUMENTS

DE    4242407    9/1993

(Continued)

OTHER PUBLICATIONS

Japanese language Abstract of JP 2005-222277, Aug. 18, 2005.

(Continued)

*Primary Examiner* — Allyson N Trail
(74) *Attorney, Agent, or Firm* — Greenblum & Bernstein, P.L.C.

(57) ABSTRACT

There is provided a non-contact type IC card that prevents electrostatic discharge failure of an IC chip embedded in an IC card.

A non-contact type IC card includes at least a magnetic recording layer, a metal reflective layer, and a hologram layer, which are sequentially laminated on a card base member, and an antenna and an IC chip connected to the antenna that are embedded in the card base member. The metal reflective layer is made of a material of which electric conductivity is smaller than $28.9 \times 10^6 / \Omega m$, or is composed of a thin film of which surface resistivity is $7.02$ ($\Omega/\square$) or more.

7 Claims, 9 Drawing Sheets

U.S. PATENT DOCUMENTS

| | | | | |
|---|---|---|---|---|
| 2006/0228649 | A1* | 10/2006 | Takada et al. | 430/270.13 |
| 2007/0097510 | A1* | 5/2007 | Carlson | 359/589 |
| 2007/0237060 | A1* | 10/2007 | Ohno et al. | 369/275.1 |
| 2008/0223855 | A1* | 9/2008 | Boxman et al. | 219/740 |

FOREIGN PATENT DOCUMENTS

| | | |
|---|---|---|
| EP | 0604943 | 7/1994 |
| JP | 11-353442 | 12/1999 |
| JP | 11-353447 | 12/1999 |
| JP | 3198183 | 6/2001 |
| JP | 2005-53091 | 3/2005 |
| JP | 2005-222277 | 8/2005 |

OTHER PUBLICATIONS

Japanese language Abstract of JP 2005-53091, Mar. 3, 2005.
Japanese language Abstract of JP 6-278390, Oct. 4, 1994.
Japanese language Abstract of JP 11-353442, Dec. 24, 1999.
Japanese language Abstract of JP 11-353447, Dec. 24, 1999.
Extended European Search Report dated Nov. 2, 2009 that issued with respect to European Patent Application No. 06823379.0.

* cited by examiner

NON-CONTACT TYPE IC CARD

FIG. 6

| MATERIAL OF METAL REFLECTIVE LAYER | ELECTRIC CONDUCTIVITY σ 10⁶ [/Ωm] TEMPERATURE CONDITION OF 20°C | PRESENCE OR ABSENCE OF ELECTROSTATIC DISCHARGE FAILURE OF IC CHIP |
|---|---|---|
| Ag | 62.9 | PRESENCE |
| Cu | 59.3 | PRESENCE |
| Al | 36.9 | PRESENCE |
| Au | 28.9 | PRESENCE |
| Zn | 16.8 | ABSENCE |
| Co | 15.7 | ABSENCE |
| Ni | 14.2 | ABSENCE |
| In | 11.3 | ABSENCE |
| Fe | 9.9 | ABSENCE |
| Cr | 7.5 | ABSENCE |
| Ti | 1.8 | ABSENCE |
| Sn | 1.0 | ABSENCE |

FIG. 8

| SURFACE RESISTIVITY OF METAL REFLECTIVE LAYER ($\Omega/\square$) | PRESENSE OR ABSENCE OF ELECTROSTATIC DISCHARGE FAILURE OF IC CHIP |
|---|---|
| 1.58 | PRESENCE |
| 1.78 | PRESENCE |
| 1.87 | PRESENCE |
| 2.33 | PRESENCE |
| 4.04 | PRESENCE |
| 7.02 | ABSENCE |
| 7.24 | ABSENCE |
| 7.50 | ABSENCE |
| 8.02 | ABSENCE |
| 16.20 | ABSENCE |

NON-CONTACT TYPE IC CARD

TECHNICAL FIELD

The present invention relates to a non-contact type IC card, and more particularly, to a non-contact type IC card including a magnetic recording layer, a metal reflective layer, and a hologram layer that are provided on at least one surface of a card base member, and an IC chip and a communication antenna that are embedded in the card base member, thereby being capable of transmitting and receiving data in a non-contact manner.

BACKGROUND ART

As a card technology has been developed in recent years, there are IC cards, which can be used for various purposes, as an information recording medium used in various communication systems. The IC cards are classified into a contact type IC card that can write and read information by coming in contact with a dedicated device, and a non-contact type IC card that can write and read information only by approaching a dedicated device.

Since these IC cards have higher security and a large amount of information capable of being written thereon in comparison with a magnetic card including a magnetic recording layer, only one IC card can be used for various purposes. For this reason, the spread of the IC card is being increased for an industrial purpose.

In particular, when information is written or read, a non-contact type IC card does not need to be inserted into a dedicated device and can be simply handled. For this reason, the non-contact type IC card is being spread for the industrial purpose.

Further, since there is also provided an IC card including a magnetic recording layer such as a magnetic stripe, only one IC card may be required for using a communication system based on a conventional magnetic recording layer and a communication system based on an IC chip.

Meanwhile, as a technical document that is filed before the present invention, there is a document disclosing a plastic card with a magnetic stripe in which while providing a visual effect using a hologram that is formed by performing hologram processing on a magnetic recording layer, the plastic card can perform functional information processing by using the magnetic recording layer (for example, see Patent Document 1).

At present, a magnetic recording layer on which hologram processing is performed has been attempted to be applied to a non-contact type IC card in order to be capable of performing functional information processing while providing a visual effect using a hologram, like the plastic card with a magnetic stripe disclosed in Patent Document 1.

However, when an electrostatic test prescribed by "JIS X 6305-6:2001 (ISO/IEC 10373-6:2001)" or "JIS X 6305-7:2001 (ISO/IEC 10373-7:2001)" is performed on the non-contact type IC card using the magnetic recording layer on which the hologram processing is performed and static electricity is discharged to the magnetic recording layer on which the hologram processing is performed, discharge current flows into an antenna embedded in the non-contact type IC card from the magnetic recording layer on which the hologram processing is performed. Finally, the discharge current flows into an IC chip connected to the antenna, so that electrostatic discharge failure of the IC chip occurs.

Further, there is a document disclosing a non-contact type IC card including a transparent/opaque type reversible thermal recording layer, as a technical document that is filed before the present invention. The transparent/opaque type reversible thermal recording layer including an insulating metal luster reflecting layer is provided on at least one surface of the non-contact type IC card in which an IC module is embedded, and the insulating metal luster reflecting layer is formed by an island-stage tin deposition, and versatility of an antenna or a coil is not lost (for example, see Patent Document 2).

Furthermore, there is a document disclosing an IC card in which a reflective thin-film layer is provided on at least a portion of structures of hologram or diffraction grating patterns, and the structures are provided at an IC module in a laminated state. Metal thin films, which are disposed in an island shape and insulated from each other, are used for the reflective thin-film layer, so that it can be avoided a bad influence on the electrical characteristics of the IC chip (for example, see Patent Document 3).

Patent Document 1: Japanese Patent No. 3198183
Patent Document 2: Japanese Patent Application Laid-Open No. H11-353442
Patent Document 3: Japanese Patent Application Laid-Open No. H11-353447

DISCLOSURE OF THE INVENTION

Problems to be Solved by the Invention

Meanwhile, Patent Document 2 disclose a non-contact type IC card including a transparent/opaque type reversible thermal recording layer in which the insulating metal luster reflecting layer is formed by the island-stage tin deposition and the versatility of an antenna or a coil is not lost. However, electrostatic discharge failure of the IC chip, which occurs when the magnetic recording layer on which the hologram processing is performed is applied to the non-contact type IC card, is not considered in Patent Document 2.

Further, in Patent Document 3, the metal thin films, which are disposed in an island shape and insulated from each other, are used for the reflective thin-film layer, so that it can be avoided a bad influence on the electrical characteristics of the IC chip. However, like in Patent Document 2, electrostatic discharge failure of the IC chip, which occurs when the magnetic recording layer on which the hologram processing is performed is applied to the non-contact type IC card, is not considered in Patent Document 3.

Means for Solving the Problems

The present invention has been made to solve the above-mentioned problems, and it is an exemplary object of the present invention to provide a non-contact type IC card including at least a magnetic recording layer, a metal reflective layer, and a hologram layer, which are sequentially laminated on a card base member, and an antenna and an IC chip connected to the antenna that are embedded in the card base member, thereby preventing electrostatic discharge failure of the IC chip embedded in the non-contact type IC card.

In order to achieve the above-mentioned exemplary object, the present invention includes following characteristics.

According to a first exemplary aspect of the present invention, a non-contact type IC card includes at least a magnetic recording layer, a metal reflective layer, and a hologram layer that are sequentially laminated on a card base member, and an antenna and an IC chip connected to the antenna that are embedded in the card base member. The metal reflective layer is made of a material of which electric conductivity is smaller than $28.9 \times 10^6/\Omega m$.

In addition, the metal reflective layer of the non-contact type IC card according to the first exemplary aspect of the present invention may be made of at least one of Sn, Ti, Cr, Fe, In, Ni, Co, and Zn. Further, it is preferable that the metal reflective layer be made of Sn, Ti, Cr, In, or Zn. Considering manufacturing cost, chemical stability, and the like, it is preferable that the metal reflective layer be made of Cr. Furthermore, considering concealability, it is preferable that the metal reflective layer be made of Sn or Cr. For this reason, it is most preferable that the metal reflective layer of the non-contact type IC card according to the first exemplary aspect of the present invention be made of Cr having low manufacturing cost, chemical stability, concealability and the like.

According to a second exemplary aspect of the present invention, a non-contact type IC card includes at least a magnetic recording layer, a metal reflective layer, and a hologram layer that are sequentially laminated on a card base member, and an antenna and an IC chip connected to the antenna that are embedded in the card base member. A surface resistivity of the metal reflective layer is 7.02 ($\Omega/\square$) or more.

In addition, the metal reflective layer of the non-contact type IC card according to the second exemplary aspect of the present invention is made of a material having light reflectivity or concealability, the metal reflective layer may be made of any material having light reflection and concealability. Further, as long as the surface resistivity of the metal reflective layer is 7.02 ($\Omega/\square$) or more, the metal reflective layer may be made of any material, for example, at least one of Al, Zn, Co, Ni, In, Fe, Cr, Ti, and Sn. Furthermore, considering workability, manufacturing cost, and the like, it is preferable that the metal reflective layer be made of Al. In addition, considering concealability, it is preferable that the metal reflective layer be made of Al, Sn, or Cr. For this reason, it is most preferable that the metal reflective layer of the non-contact type IC card according to the second exemplary aspect be made of Al having workability, low manufacturing cost, concealability and the like.

Further, the metal reflective layer of each of the non-contact type IC cards according to the first and second exemplary aspect of the present invention may be composed of a continuous film.

Furthermore, the magnetic recording layer, the metal reflective layer, and the hologram layer of each of the non-contact type IC cards according to the first and second exemplary aspect of the present invention may be integrated.

Effect of the Invention

Even when an electrostatic test prescribed by "JIS X 6305-6:2001 (ISO/IEC 10373-6:2001)" or "JIS X 6305-7:2001 (ISO/IEC 10373-7:2001)" is performed and static electricity is discharged to the metal reflective layer, the non-contact type IC card according to the present invention can limit discharge current that flows from the metal reflective layer to the antenna. Therefore, it is possible to prevent the electrostatic discharge failure of the IC chip embedded in the non-contact type IC card.

BEST MODE FOR CARRYING OUT THE INVENTION

The characteristic of a non-contact type IC card according to an exemplary embodiment of the present invention will be described with reference to FIGS. 1 and 2.

As shown in FIG. 1, the non-contact type IC card according to this exemplary embodiment is a non-contact type IC card where a hologram-magnetic recording layer 2 is provided on a card base member 1 and an antenna 12 and an IC chip 13 connected to the antenna 12 are embedded in the card base member 1.

Further, as shown in FIG. 2, the hologram-magnetic recording layer 2 includes at least a magnetic recording layer 22, a metal reflective layer 23, and a hologram layer 24.

Meanwhile, the metal reflective layer 23 of this exemplary embodiment is made of a material of which electric conductivity is smaller than $28.9 \times 10^6/\Omega m$, or is made of a thin film of which surface resistivity is 7.02 ($\Omega/\square$) or more.

Accordingly, even when an electrostatic test prescribed by "JIS X 6305-6:2001 (ISO/IEC 10373-6:2001)" or "JIS X 6305-7:2001 (ISO/IEC 10373-7:2001)" is performed and static electricity is discharged to the metal reflective layer 23, the non-contact type IC card according to this exemplary embodiment can limit discharge current that flows from the metal reflective layer 23 to the antenna 12 and can prevent electrostatic discharge failure of the IC chip 13 embedded in the IC card. The non-contact type IC card according to this exemplary embodiment will be described below with reference to accompanying drawings.

First Exemplary Embodiment

Structure of Non-Contact Type IC Card

First, the structure of a non-contact type IC card according to this exemplary embodiment will be described with reference to FIG. 1.

As shown in FIG. 1, the non-contact type IC card according to this exemplary embodiment includes a card base member 1 and a hologram-magnetic recording layer 2. Further, an antenna 12 and an IC chip 13 are embedded in the card base member 1 of this exemplary embodiment as shown in FIG. 1. The IC chip 13 is connected to the antenna 12, and embedded in the card base member 1.

<Structure of Card Base Member 1>

The structure of the card base member 1 of the non-contact type IC card according to this exemplary embodiment will be described below with reference to FIG. 1.

The card base member 1 of the non-contact type IC card according to this exemplary embodiment is structured as follows: As shown in FIG. 1, antenna pattern 12, such as helicoidal antennas or capacitors, form an antenna pattern on an antenna substrate 11, and the IC chip 13 is mounted on the antenna substrate 11 so that the antenna pattern 12 and the IC chip 13 are electrically connected to each other by an adhesive 14, and an IC module 15 is formed. Then, core sheets 16 and over sheets 17, which are used as laminated base materials, are laminated from upper and lower sides of the IC module 15 so as to cover the IC module 15.

<Description of Each of Parts of Card Base Member 1>

Each of parts of the card base member 1 will be described below.

<Core Sheet 16>

The core sheet 16 is a base material that forms a middle portion of the card base member 1, and is a base material that makes a card body strong. As a material that may be used as the material of the core sheet 16, known resins that may be used as the card base member 1 forming the middle portion of the IC card body in the related art, for example, thermoplastic resins, such as a general-purpose polystyrene resin, an impact-resistant polystyrene resin, an acrylonitrile styrene resin, an ABS (acrylonitrile butadiene styrene copolymer)

resin, an acrylic resin, a polyethylene resin, a polypropylene resin, a polyamide resin, a polyacetal resin, a PC (polycarbonate) resin, a vinyl chloride resin, a modified PPO resin, a polybutylene terephthalate resin, and a polyphenylene sulfide resin; alloy-based resins; reinforced resins obtained by adding glass fiber, can be used. Meanwhile, since vinyl chloride, PET-G, or the like have characteristics for performing self-fusing, an adhesive or an adhesive sheet are not needed for laminating the vinyl chloride, PET-G, or the like. Therefore, it is preferable that vinyl chloride, PET-G, or the like be used as the material of the core sheet 16.

<Over Sheet 17>

The over sheet 17 is a base material that forms an outer portion of the card base member 1. Examples of a material that may be used as the material of the over sheet 17 include the resins that may be used as the material of the above-mentioned core sheet 16.

<Antenna Substrate 11>

The antenna substrate 11 is a base material having an insulation property on which the antenna pattern 12 is formed. Examples of a material that may be used as the material of the antenna substrate 11 include resins, such as, a polyester resin, a polyethylene resin, a polypropylene resin, a polyimide resin, PET, PEN, and PET-G.

<Material of Antenna Pattern 12>

Examples of a material that may be used as the material of the antenna pattern 12 include copper, aluminum, gold, silver, iron, tin, nickel, zinc, titanium, tungsten, solder, and an alloy. Meanwhile, an etching method and a printing method (a screen printing method or an offset printing method) may be used as a method of forming the antenna pattern 12 on the antenna substrate 11. Further, a winding method may be used to form the antenna pattern 12 on the antenna substrate 11.

<Adhesive 14>

The adhesive 14 is used for the connection between the antenna pattern 12 formed on the antenna substrate 11 and electronic components, such as the IC chip 13. Examples of the adhesive 14 include a UV curable resin, a moisture-curable resin, and a thermosetting resin. Further, the connection between the antenna pattern 12 and the electronic components, such as and the IC chip 13, may be preferably performed by a flip chip method using an adhesive, such as an anisotropic conductive adhesive (ACP) that is obtained by dispersing fine conductive particles having a diameter of several μm in an thermosetting epoxy resin or an epoxy resin, and an anisotropic conductive film (ACF) that is obtained by forming the ACP in the shape of a film. Meanwhile, the ACF is an adhesive that is obtained by dispersing conductive particles made of plastic coated with nickel or metal, or metallic particles themselves in an adhesive such as an epoxy resin.

<Structure of Hologram-Magnetic Recording Layer 2>

The structure of the hologram-magnetic recording layer 2 of the non-contact type IC card according this exemplary embodiment will be described below with reference to FIG. 2.

The hologram-magnetic recording layer 2 includes an adhesion layer 21, a magnetic recording layer 22, a metal reflective layer 23, a hologram layer 24, and a passivation layer 25. The hologram-magnetic recording layer 2 is laminated on a support layer 27 with a release layer 26 therebetween, thereby forming a "transfer sheet".

<Adhesion Layer 21>

The adhesion layer 21 is a layer for adhering the hologram-magnetic recording layer 2 onto the card base member 1. Examples of a material that may be used as the material of the adhesion layer 21 include synthetic resins such as vinyl chloride/vinyl acetate copolymers having an excellent heat-sealing property. It is preferable that the thickness of the adhesion layer 21 be about 5 μm.

<Magnetic Recording Layer 22>

The magnetic recording layer 22 is a layer on which information can be recorded, and is formed by performing printing or application using known magnetic paint. Meanwhile, the following material may be used as the magnetic paint. That is, the material is prepared by using a synthetic resin, such as a butyral resin, vinyl chloride/vinyl acetate copolymers, an urethane resin, a polyester resin, a cellulose-based resin, an acrylic resin, or styrene/maleic acid copolymer resins, as a binder resin; adding an urethane elastomer or a rubber-based resin such as nitrile rubber, if necessary; adding $\gamma$-$Fe_2O_3$, $Fe_2O_3$ containing Co, $Fe_3O_4$, barium ferrite, strontium ferrite, Co, Ni, Fe, or Cr alone or an alloy thereof, a rare-earth Co magnetic substance or the like, a surface active agent, a silane coupling agent, a plasticizer, wax, silicone oil, carbon, and other pigment as a magnetic substance, if necessary; and mixing them using three rollers, a sand mill, a ball mill, or the like. Meanwhile, it is preferable that the thickness of the magnetic recording layer 22 be in the range of about 10 to 15 μm.

<Metal Reflective Layer 23>

The metal reflective layer 23 is a layer for reflecting light. Examples of a material that may be used as the material of the metal reflective layer 23 of this exemplary embodiment include Zn, Co, Ni, In, Fe, Cr, Ti, Sn, and various alloys thereof. Further, a vacuum deposition method, a sputtering method, a reactive sputtering method, an ion plating method, and an electroplating method may be used as a method of forming the metal reflective layer 23. Meanwhile, the thickness of the metal reflective layer 23 is preferably in the range of about 30 to 100 nm, and more preferably in the range of about 40 to 70 nm. Furthermore, it is preferable that the metal reflective layer 23 be composed of a continuous film in consideration of light reflectivity.

<Hologram Layer 24>

The hologram layer 24 is a layer for forming a hologram forming portion 30. Meanwhile, example of a material that may be used as the material of the hologram layer 24 include thermoplastic resins, such as polyvinyl chloride, acryl (for example, MMA), polystyrene, and polycarbonate; materials obtained by hardening thermosetting resins, such as unsaturated polyester, melamine, epoxy, polyester (metha)acrylate, urethane (metha)acrylate, epoxy (metha)acrylate, polyether (metha)acrylate, polyol (metha)acrylate, melamine (metha)acrylate, and triazine-based acrylate; and mixtures of the thermoplastic resins and the thermosetting resins. It is preferable that the thickness of the hologram layer 24 be about 2.5 μm.

<Passivation Layer 25>

The passivation layer 25 is a layer for protecting the above-mentioned hologram layer 24. Meanwhile, examples of a material that may be used as the material of the passivation layer 25 include a mixture of a polymethylmethacrylate resin and another thermoplastic resin, for example, vinyl chloride/vinyl acetate copolymers or a nitrocellulose resin; a mixture of a polymethylmethacrylate resin and a polyethylene wax; and a mixture of an acetylcellulose resin and a thermosetting resin, for example, an epoxy resin, a phenol resin, a thermosetting acrylic resin, or a melamine resin. It is preferable that the thickness of the passivation layer 25 be in the range of about 1 to 2 μm.

<Release Layer 26>

The release layer 26 is a layer for separating the above-mentioned hologram-magnetic recording layer 2 from the support layer 27. Meanwhile, examples of a material that may be used as the material of the release layer 26 include a thermoplastic acrylic resin, a polyester resin, a chlorinated rubber-based resin, a vinyl chloride-vinyl acetate copolymer resin, a cellulose-based resin, a chlorinated polypropylene resin, and a material that is obtained by adding oil silicon, fatty acid amide, or zinc stearate to the above-mentioned resins. It is preferable that the thickness of the release layer 26 be about 0.5 μm.

<Support Layer 27>

The support layer 27 is a layer that supports the hologram-magnetic recording layer 2. Meanwhile, examples of a material that may be used as the material of the support layer 27 include one selected from synthetic resins, such as a transparent polyethylene terephthalate film, polyvinyl chloride, polyester, polycarbonate, polymethyl methacrylate, and polystyrene, natural resins, paper, synthetic paper, and the like; and compound materials that are obtained from the combination of the selected above-mentioned materials. It is preferable that a polyester film having tensile strength and heat resistance be used for the support layer 27. It is preferable that the thickness of the support layer 27 be about 25 μm.

Further, the following method may be used as a method of forming a transfer sheet of the hologram-magnetic recording layer 2 shown in FIG. 2. The method includes, for example, sequentially applying the release layer 26 and the passivation layer 25 on the support layer 27, applying a resin composition forming the hologram layer 24 so as to form the hologram forming portion 30, forming the metal reflective layer 23 by a deposition method, and sequentially applying the magnetic recording layer 22 and the adhesion layer 21. Accordingly, it is possible to form the transfer sheet of the hologram-magnetic recording layer 2 shown in FIG. 2. Meanwhile, the above-mentioned method is an example, and the method of forming a transfer sheet is not limited thereto. As long as the transfer sheet of the hologram-magnetic recording layer 2 shown in FIG. 2 is formed, any method may be used. In this exemplary embodiment, the total thickness of the passivation layer 25, the hologram layer 24, the metal reflective layer 23, and the magnetic recording layer 22 of the hologram-magnetic recording layer 2 of this exemplary embodiment is preferably 20 μm or less not to affect the magnetic recording.

According to this exemplary embodiment, the hologram-magnetic recording layer 2 where at least the magnetic recording layer 22, the metal reflective layer 23, and the hologram layer 24 are integrated is adhered to the card base member 1, so that the non-contact type IC card shown in FIG. 1 in which the hologram-magnetic recording layer 2 is formed on the card base member 1 is formed. Therefore, it is possible to form the hologram-magnetic recording layer 2, which forms a beautiful hologram and can perform mechanical information processing, on the surface of the non-contact type IC card.

Further, in general, if the antenna 12 of the non-contact type IC card is smaller than an antenna of a reader or a writer, it is possible to obtain larger energy from the antenna of the reader or the writer as an area of the antenna 12 of the non-contact type IC card becomes larger. Accordingly, to increase the communication distance of the non-contact type IC card or the electrical power consumption of the IC chip 13 of the non-contact type card, the opening area of the antenna 12 of the non-contact type IC card needs to be designed to be large.

For this reason, it is preferable that the antenna 12 of the non-contact type IC card according to this exemplary embodiment is disposed along the outline of the IC card for the sake of design. Therefore, as shown in FIG. 3, the hologram-magnetic recording layer 2 and the antenna 12 embedded in the card base member 1 are designed to overlap each other.

However, when the hologram-magnetic recording layer 2 and the antenna 12 embedded in the card base member 1 are designed to overlap each other as shown in FIG. 3, there are the following problems. If an electrostatic test is performed in compliance with a test method prescribed by "JIS X 6305-6:2001 (ISO/IEC 10373-6:2001)" of JIS, the IC card cannot withstand static electricity of ±6 kV that is a prescribed value prescribed by 4.3.7 of "JIS X 6322-1:2001 (ISO/IEC 14443-1:2000)". Further, if an electrostatic test is performed in compliance with a test method prescribed by "JIS X 6305-7:2001 (ISO/IEC 10373-7:2001)" of JIS, the IC card cannot withstand static electricity of ±6 kV that is a prescribed value prescribed by 4.3.7 of "JIS X 6323-1:2001 (ISO/IEC 15693-1:2000)".

Meanwhile, an electrostatic test prescribed by "JIS X 6305-6:2001 (ISO/IEC 10373-6:2001)" or "JIS X 6305-7:2001 (ISO/IEC 10373-7:2001)" is performed using an electrostatic discharge test circuit shown in FIG. 4.

First, an "insulation plate" having a thickness of 0.5 mm is disposed on a "conductive plate" placed on a wooden table, and the "non-contact type IC card" is disposed on the "insulation plate". Then, a "spherical probe", which is connected to an "ESD tester" and has a diameter of 8 mm, comes in contact with the "non-contact type IC card". Subsequently, after static electricity is discharged from the "ESD tester" to the "non-contact type IC card", the performance of the IC chip 13 of the non-contact type IC card is tested.

Meanwhile, the electrostatic discharge test shown in FIG. 4 is performed under the following conditions:

Charge storage capacitor: 150 pF±10%
Discharge resistance: 330 Ω±10%
Charge resistance: 50 to 100 MΩ
Rising time: 0.7 to 1 ns First, as shown in FIG. 5, each of the surface and the back surface of the non-contact type IC card is divided into twenty regions in the form of a 4×5 matrix. After that, the static electricity of +6 kV is applied to the twenty regions on the surface of the non-contact type IC card in rotation, and the static electricity of −6 kV is then applied to the twenty regions. Subsequently, the same processes as described above are performed on the back surface of the non-contact type IC card. Meanwhile, numerals "1" to "20" shown in FIG. 5 indicate the regions divided on the card in the electrostatic discharge test.

When the electrostatic test is performed using the electrostatic discharge test circuit shown in FIG. 4, the electrostatic discharge failure of the IC chip 13 embedded in the card base member 1 occurs. The reason for this is as follows. The hologram-magnetic recording layer 2 and the antenna 12 embedded in the card base member 1 overlap each other. Accordingly, when static electricity is discharged to the hologram-magnetic recording layer 2, discharge current flows into the antenna 12 overlapping the hologram-magnetic recording layer 2. Finally, the discharge current flowing into the antenna flows into the IC chip 13, so that excessive load is generated on the IC chip 13.

Meanwhile, the position where the hologram-magnetic recording layer 2 is disposed in the card base member 1 is determined by standards depending on the intended use of the card. For example, according to the standard of "JIS X 6302-2:2005 (ISO/IEC 7811-2:2001)" or "JIS X 6302-6:2005 (ISO/IEC 7811-6:2001)", a distance between the upper end of the non-contact type IC card and the front side of the hologram-magnetic recording layer 2 is determined by 5.54 mm to the maximum extent, and a distance between the upper end of the non-contact type IC card and the rear side of the hologram-magnetic recording layer 2 is determined by 11.89 mm to the minimum extent in the case of two tracks and determined by 15.95 mm to the minimum extent in the case of three tracks. Accordingly, when the antenna 12 is disposed in the card base member 1 to make the communication characteristic of the non-contact type IC card good, the hologram-magnetic recording layer 2 and the antenna 12 overlap each other as shown in FIG. 3.

For this reason, the present inventors tried to modify the non-contact type IC card in various ways in order to make the non-contact type IC card including the hologram-magnetic recording layer 2 shown in FIGS. 1 and 3 meet the above-mentioned electrostatic test. As a result of enthusiastic studies, the present inventors found out from the experiment that the non-contact type IC card met the electrostatic test through the modification of the material of the metal reflective layer 23 of the hologram-magnetic recording layer 2. A relationship between a material, which may be used as the material of the metal reflective layer 23, and the electrostatic discharge failure of the IC chip 13 caused by the electrostatic test shown in FIG. 4 will be described below with reference to FIG. 6. Further, FIG. 6 shows measurement results representing a relationship between the electric conductivity of the material applied to the metal reflective layer 23 and the presence or absence of the electrostatic discharge failure of the IC chip 13 that is caused by the electrostatic test of the non-contact type IC card using the material.

Meanwhile, the measurement results shown in FIG. 6 are results that are obtained by performing the electrostatic test shown in FIG. 4 under a temperature condition of 20° C. after a non-contact type IC card shown in FIG. 7 is manufactured.

Further, the non-contact type IC card shown in FIG. 7 is a card that is manufactured by using the following materials, being interposed between stainless plates having a thickness of 1 mm, and thermally compressed by a hot press.

Over sheet 17-1: CG030M: 50 μm (manufactured by Taihei Chemicals Limited)

Core sheet 16-1: PG700M: 125 μm (manufactured by Taihei Chemicals Limited)

Core sheet 16-2: PG700M: 200 μm (manufactured by Taihei Chemicals Limited)

IC module 15: RC-S935A (manufactured by Sony Corporation)

Core sheet 16-3: PG700M: 200 μm (manufactured by Taihei Chemicals Limited)

Core sheet 16-4: PG700M: 125 μm (manufactured by Taihei Chemicals Limited)

Over sheet 17-2: CG030M: 50 μm (manufactured by Taihei Chemicals Limited)

Meanwhile, a hologram-magnetic recording layer having a width of 8.4 mm was used as the hologram-magnetic recording layer 2, and as disposed at a position prescribed by a standard of "JIS X 6302-2:2005 (ISO/IEC 7811-2:2001)" or "JIS X 6302-6:2005 (ISO/IEC 7811-6:2001)".

The measurement results shown in FIG. 6 are results of the electrostatic discharge failure of the IC chip 13 when Ag, Cu, Al, Au, Zn, Co, Ni, In, Fe, Cr, Ti, and Sn are used as the material of the metal reflective layer 23 of the hologram-magnetic recording layer 2. As apparent from the measurement results shown in FIG. 6, it is identified that the electrostatic discharge failure of the IC chip 13 does not occur when Zn, Co, Ni, In, Fe, Cr, Ti, and Sn are used as the material of the metal reflective layer 23. Accordingly, if a material having an electric conductivity smaller than the electric conductivity ($28.9 \times 10^6/\Omega m$) of Au is used as the material of the metal reflective layer 23, the electrostatic discharge failure of the IC chip 13 does not occur.

For this reason, it is preferable that the metal reflective layer 23 of the hologram-magnetic recording layer 2 be made of a material having an electric conductivity smaller than $28.9 \times 10^6/\Omega m$. Accordingly, it is possible to prevent the electrostatic discharge failure of the IC chip 13 that is embedded in the non-contact type IC card including the hologram-magnetic recording layer 2.

As described above, the non-contact type IC card according to this exemplary embodiment includes the hologram-magnetic recording layer 2 on the card base member 1, and the antenna 12 and the IC chip 13 connected to the antenna 12 are embedded in the card base member 1. Accordingly, even when the hologram-magnetic recording layer 2 and the antenna 12 are designed so as to overlap each other, if the metal reflective layer 23 of the hologram-magnetic recording layer 2 is made of a material having an electric conductivity smaller than $28.9 \times 10^6/\Omega m$, the non-contact type IC card meets the standard of "JIS X 6322-1:2001 (ISO/IEC 14443-1:2000)" even though an electrostatic test prescribed by "JIS X 6305-6:2001 (ISO/IEC 10373-6:2001)" is performed. Further, even when an electrostatic test prescribed by "JIS X 6305-7:2001 (ISO/IEC 10373-7:2001)" is performed, the non-contact type IC card meets the standard of "JIS X 6323-1:2001 (ISO/IEC 15693-1:2000).

Meanwhile, from the measurement results shown in FIG. 6, Zn, Co, Ni, In, Fe, Cr, Ti, and Sn have been used as the material of the metal reflective layer 23 of the hologram-magnetic recording layer 2 of the non-contact type IC card according to the above-mentioned exemplary embodiment. However, as long as the electric conductivity of the material of the metal reflective layer 23 is smaller than $28.9 \times 10^6/\Omega m$, it goes without saying that at least one of Zn, Co, Ni, In, Fe, Cr, Ti, and Sn may be used as the material of the metal reflective layer.

Further, it is preferable that Sn, Ti, Cr, In, and Zn be used as the material of the above-mentioned metal reflective layer 23. Considering manufacturing cost, chemical stability, and the like, it is preferable that Cr be used as the material of the metal reflective layer. Furthermore, considering concealability, it is preferable that Sn and Cr be used as the material of the metal reflective layer. For this reason, it is most preferable that Cr having low manufacturing cost, chemical stability, and concealability be used as the material of the metal reflective layer 23 of this exemplary embodiment.

Second Exemplary Embodiment

A non-contact type IC card according to a second exemplary embodiment will be described below.

A non-contact type IC card according to a second exemplary embodiment is characterized in that a metal reflective layer 23 of a hologram-magnetic recording layer 2 is formed to have a surface resistivity of 7.02 ($\Omega/\square$) or more. Accordingly, even when an electrostatic test prescribed by "JIS X 6305-6:2001 (ISO/IEC 10373-6:2001)" or "JIS X 6305-7:2001 (ISO/IEC 10373-7:2001)" is performed and static electricity is discharged to the metal reflective layer 23, it is possible to limit discharge current that flows from the metal reflective layer 23 to an antenna 12. As a result, it is possible to prevent electrostatic discharge failure of an IC chip 13 embedded in the IC card. The non-contact type IC card according to the second exemplary embodiment will be described below with reference to FIGS. 8 and 9.

The non-contact type IC card according to the second exemplary embodiment includes the same structure as the non-contact type IC card according to the first exemplary embodiment that is shown in FIG. 1. Meanwhile, the metal reflective layer 23 of the non-contact type IC card according to the first exemplary embodiment has been made of a material having an electric conductivity smaller than $28.9 \times 10^6/\Omega m$. However, as long as the surface resistivity of the metal reflective layer 23 is 7.02 ($\Omega/\square$) or more, the metal reflective layer 23 of the non-contact type IC card according to the second exemplary embodiment may be made of any material, for example, Al, Zn, Co, Ni, In, Fe, Cr, Ti, Sn, or various alloys thereof.

First, a relationship between the metal reflective layer 23 having a predetermined surface resistivity and the presence or absence of electrostatic discharge failure of the IC chip 13, which is caused by the electrostatic test shown in FIG. 4, will be described with reference to FIG. 8. Meanwhile, FIG. 8 shows measurement results showing a relationship between the metal reflective layer 23 having a predetermined surface resistivity and the presence or absence of electrostatic discharge failure of the IC chip 13 that is caused by an electrostatic test of the non-contact type IC card using the metal reflective layer 23.

Meanwhile, the measurement results shown in FIG. 8 are results that are obtained by performing the electrostatic test shown in FIG. 4 under a temperature condition of 20° C. after a non-contact type IC card shown in FIG. 7 is manufactured.

Further, the non-contact type IC card shown in FIG. 7 is a card that is manufactured by using the following materials, being interposed between stainless plates having a thickness of 1 mm, and thermally compressed by a hot press.

Over sheet 17-1: CG030M: 50 μm (manufactured by Taihei Chemicals Limited)

Core sheet 16-1: PG700M: 125 μm (manufactured by Taihei Chemicals Limited)

Core sheet 16-2: PG700M: 200 μm (manufactured by Taihei Chemicals Limited)

IC module 15: RC-S935A (manufactured by Sony Corporation)

Core sheet 16-3: PG700M: 200 μm (manufactured by Taihei Chemicals Limited)

Core sheet 16-4: PG700M: 125 μm (manufactured by Taihei Chemicals Limited)

Over sheet 17-2: CG030M: 50 μm (manufactured by Taihei Chemicals Limited)

Meanwhile, a hologram-magnetic recording layer having a width of 8.4 mm was used as the hologram-magnetic recording layer 2, and was disposed at a position prescribed by a standard of "JIS X 6302-2:2005 (ISO/IEC 7811-2:2001)" or "JIS X 6302-6:2005 (ISO/IEC 7811-6:2001)".

Further, the "surface resistivity" shown in FIG. 8 is a value measured using a fall-of-potential method by applying a low voltage of 1 V to both ends of the metal reflective layer 23 of the hologram-magnetic recording layer 2, after Al is used as the material of the metal reflective layer 23 and the hologram-magnetic recording layer 2 is disposed on the card base member 1, as shown in FIG. 9. Furthermore, the "surface resistivity" is calculated by an equation "surface resistivity"=(V/I)×(W/L).

As apparent from the measurement results shown in FIG. 8, it is identified that the electrostatic discharge failure of the IC chip 13 does not occur when the hologram-magnetic recording layer 2 is formed using the metal reflective layer 23 having a surface resistivity of 7.02 ($\Omega/\square$) or more.

For this reason, if the hologram-magnetic recording layer 2 is formed by using the metal reflective layer 23 having a surface resistivity of 7.02 ($\Omega/\square$) or more, discharge current flowing from the metal reflective layer 23 to an antenna 12 is limited and the electrostatic discharge failure of the IC chip 13 embedded in the IC card does not occur, even though the hologram magnetic recording layer 2 is disposed at a position prescribed by a standard of "JIS X 6302-2:2005 (ISO/IEC 7811-2:2001)" or "JIS X 6302-6:2005 (ISO/IEC 7811-6:2001)" so as to form the non-contact type IC card, an electrostatic test prescribed by "JIS X 6305-6:2001 (ISO/IEC 10373-6:2001)" or "JIS X 6305-7:2001 (ISO/IEC 10373-7:2001)" is performed, and static electricity is discharged to the metal reflective layer 23.

As described above, the non-contact type IC card according to the second exemplary embodiment includes the hologram-magnetic recording layer 2 on the card base member 1, and the antenna 12 and the IC chip 13 connected to the antenna 12 are embedded in the card base member 1. Accordingly, even when the hologram-magnetic recording layer 2 and the antenna 12 are designed to overlap each other, if the metal reflective layer 23 of the hologram-magnetic recording layer 2 is formed to have a surface resistivity of 7.02 ($\Omega/\square$) or more, the non-contact type IC card meets the standard of "JIS X 6322-1:2001 (ISO/IEC 14443-1:2000)" even though an electrostatic test prescribed by "JIS X 6305-6:2001 (ISO/IEC 10373-6:2001)" is performed. Further, even though an electrostatic test prescribed by "JIS X 6305-7:2001 (ISO/IEC 10373-7:2001)" is performed, the non-contact type IC card meets the standard of "JIS X 6323-1:2001 (ISO/IEC 15693-1:2000).

Meanwhile, as apparent from the measurement results shown in FIG. 8, as long as the metal reflective layer 23 of the hologram-magnetic recording layer 2 of the above-mentioned second exemplary embodiment is formed to have a surface resistivity of 7.02 ($\Omega/\square$) or more, the metal reflective layer may be made of any material. For example, at least one of Al, Zn, Co, Ni, In, Fe, Cr, Ti, and Sn may be used as the material of the metal reflective layer 23.

Considering workability, manufacturing cost, and the like, it is preferable that Al be used as the material of the metal reflective layer 23. Furthermore, considering concealability, it is preferable that Al, Sn, and Cr be used as the material of the metal reflective layer. For this reason, it is most preferable that Al having workability, low manufacturing cost, and concealability be used as the material of the metal reflective layer 23 of the second exemplary embodiment.

The above-mentioned exemplary embodiments are preferred exemplary embodiments of the present invention. Accordingly, the present invention is not limited to the exemplary embodiments, and various modifications may be made thereto without departing from the scope and spirit of the present invention.

For example, as long as the hologram-magnetic recording layer 2 of the non-contact type IC card according to the above-mentioned exemplary embodiment includes at least the magnetic recording layer 22, the metal reflective layer 23, and the hologram layer 24, the hologram-magnetic recording layer 2 is not particularly limited and may be formed in any layer structure.

INDUSTRIAL APPLICABILITY

The non-contact type IC card according to the present invention may be applied to information recording media that perform non-contact communication, such as commutation tickets and coupon ticket for various means of communication, a telephone card, an admission card for a specified region, an ID card, a license, cards used for Japanese pinball, an amusement park, and a movie theater, and a credit card.

BRIEF DESCRIPTION OF THE DRAWINGS

FIG. 6 is a view showing a relationship between a material that may be used as the material of a metal reflective layer 23, and the electrostatic discharge failure of an IC chip 13 that is caused by an electrostatic test of the non-contact type IC card using the material.

FIG. 8 is a view showing a relationship between a metal reflective layer 23 having a predetermined surface resistivity and the presence or absence of electrostatic discharge failure of an IC chip 13 that is caused by an electrostatic test of the non-contact type IC card using the metal reflective layer 23.

DESCRIPTION OF REFERENCE NUMERALS

Figure 1:
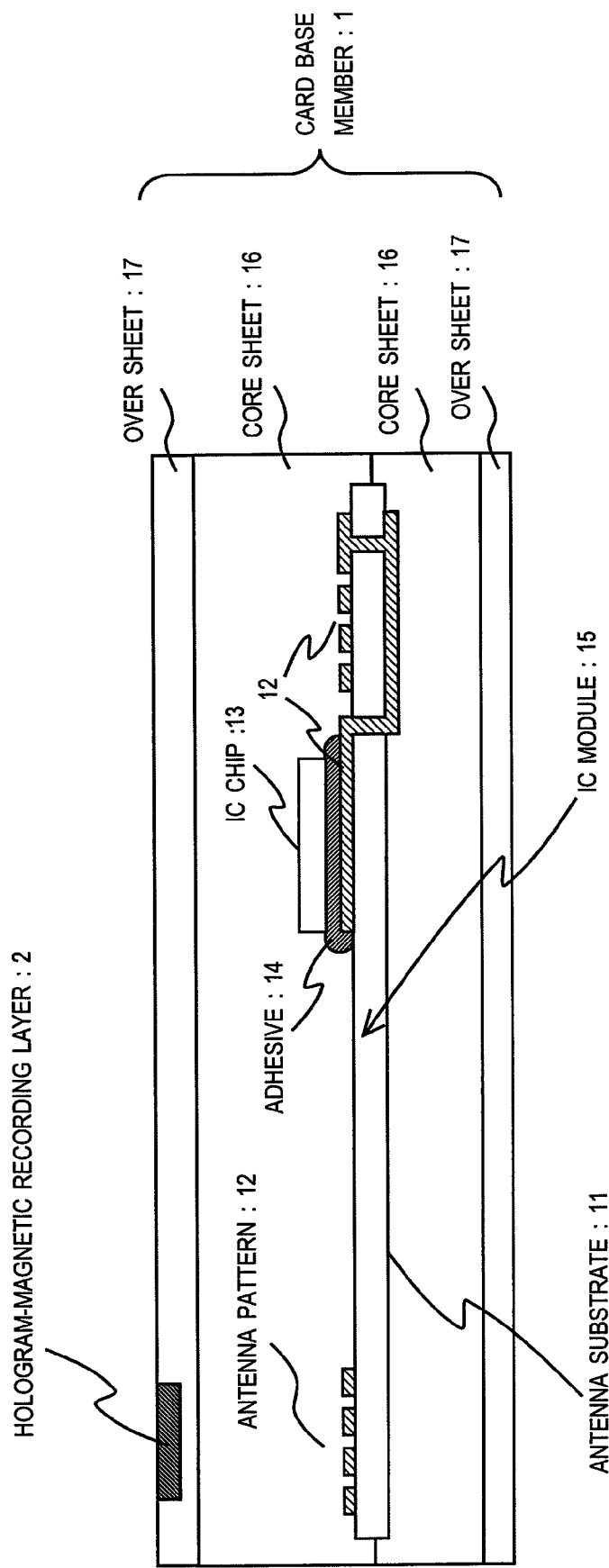
FIG. 1 is a view showing the structure of a non-contact type IC card according to an exemplary embodiment of the present invention.
Figure 2:
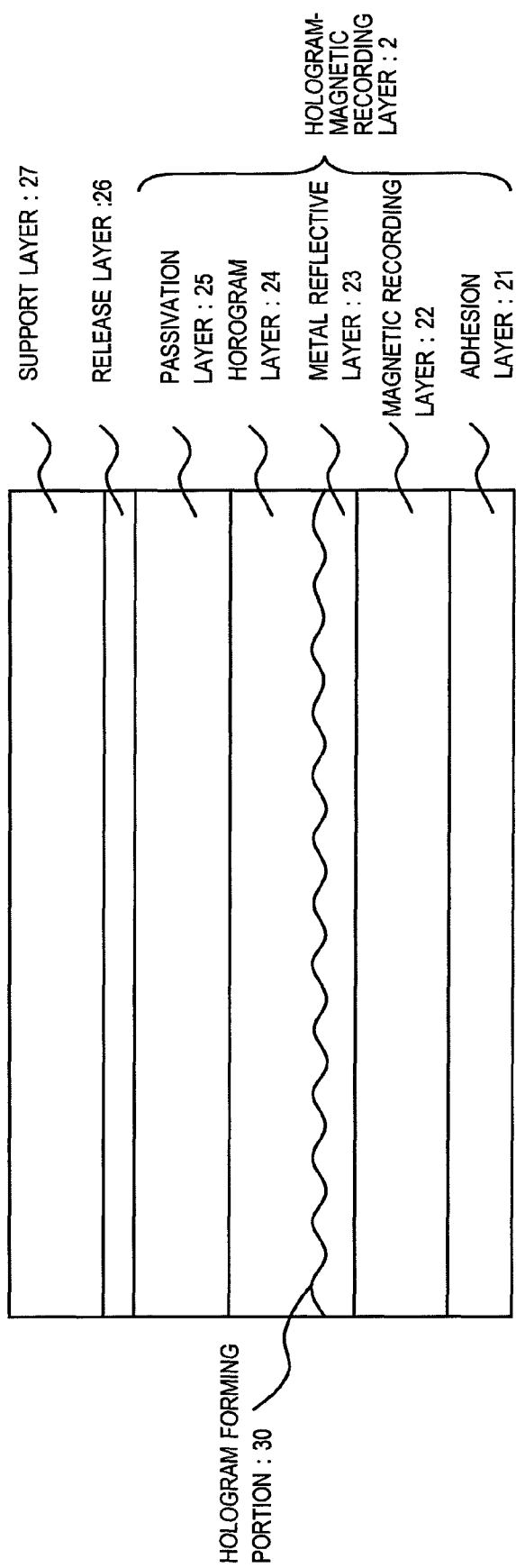
FIG. 2 is a view showing the structure of a hologram-magnetic recording layer 2 that is included in the non-contact type IC card according to the exemplary embodiment.
Figure 3:
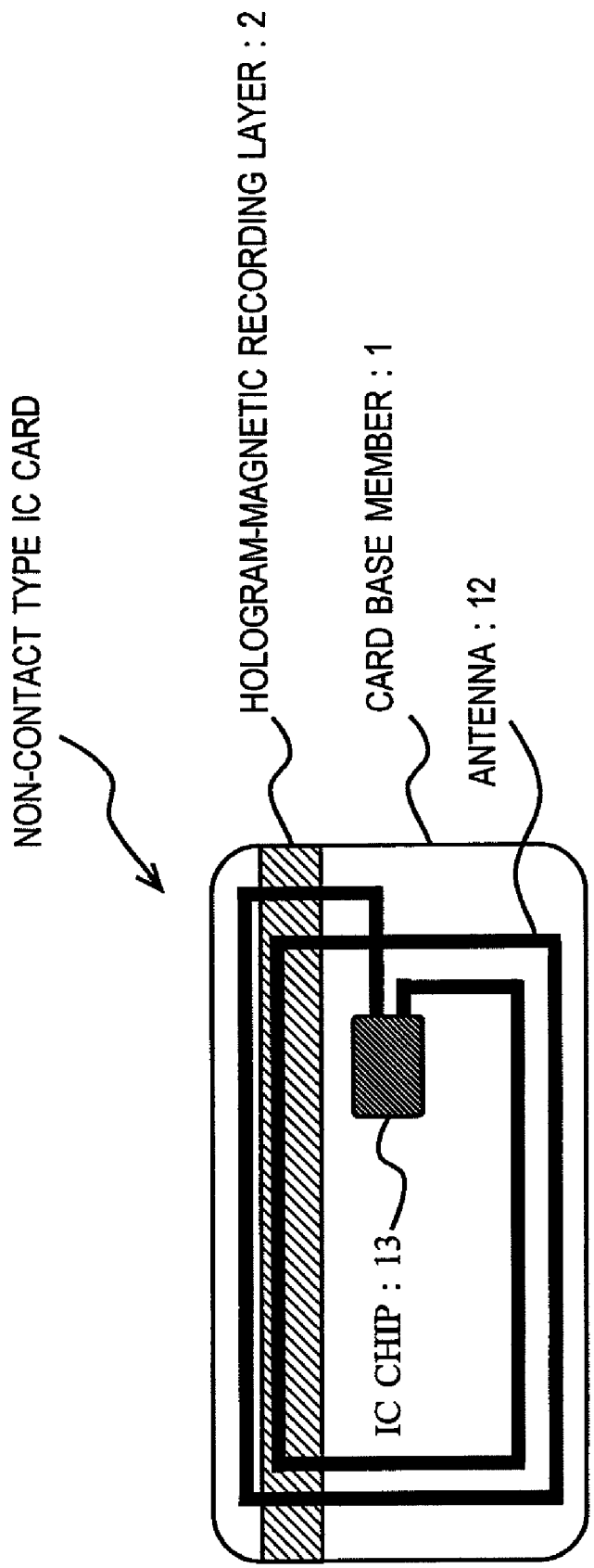
FIG. 3 is a view showing a positional relationship between an antenna 12 and the hologram-magnetic recording layer 2 of the non-contact type IC card according to the exemplary embodiment.
Figure 4:
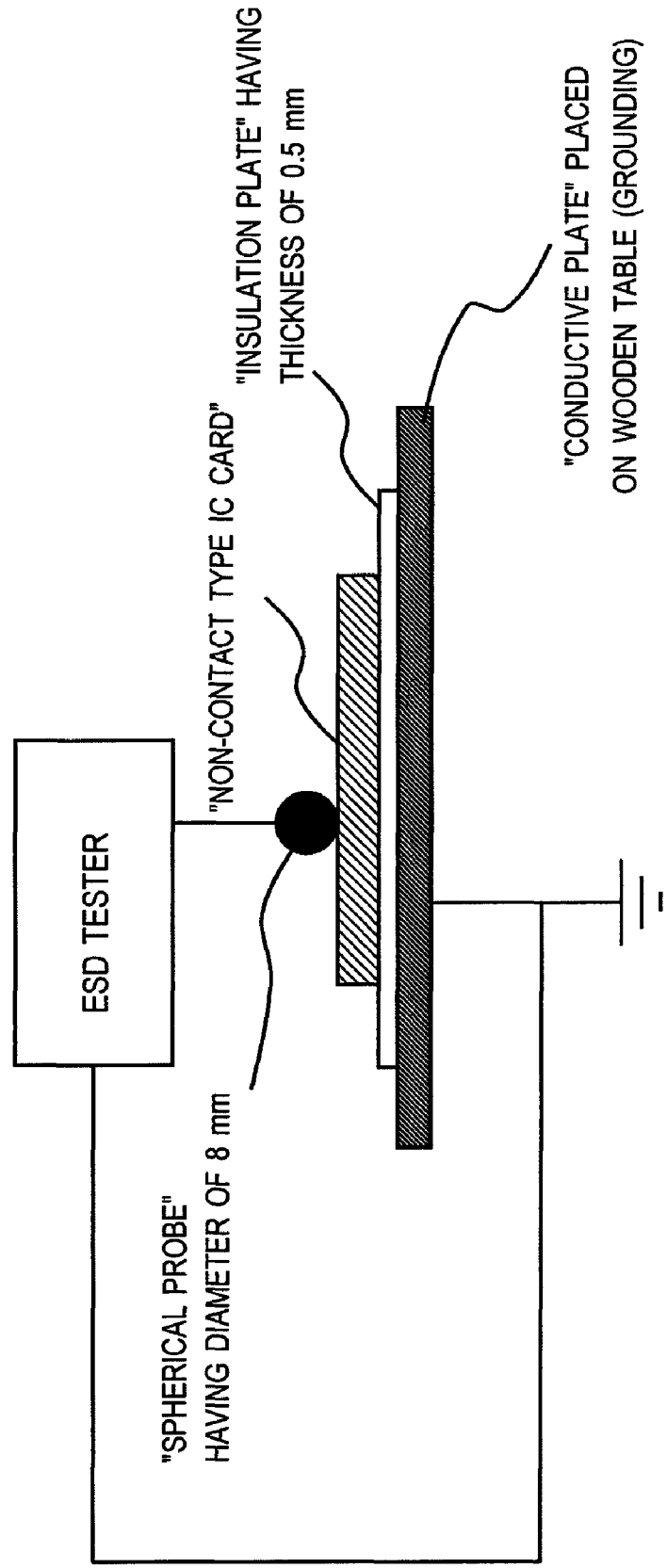
FIG. 4 is a view showing the structure of a circuit used for an electrostatic test that is prescribed by "JIS X 6305-6:2001 (ISO/IEC 10373-6:2001)" or "JIS X 6305-7:2001 (ISO/IEC 10373-7:2001)".
Figure 5:
FIG. 5 is a view showing divided regions that are formed on the card in an electrostatic discharge test, and a view showing that each of the surface and the back surface of the non-contact type IC card is divided into twenty regions in the form of a 4×5 matrix.
Figure 7:
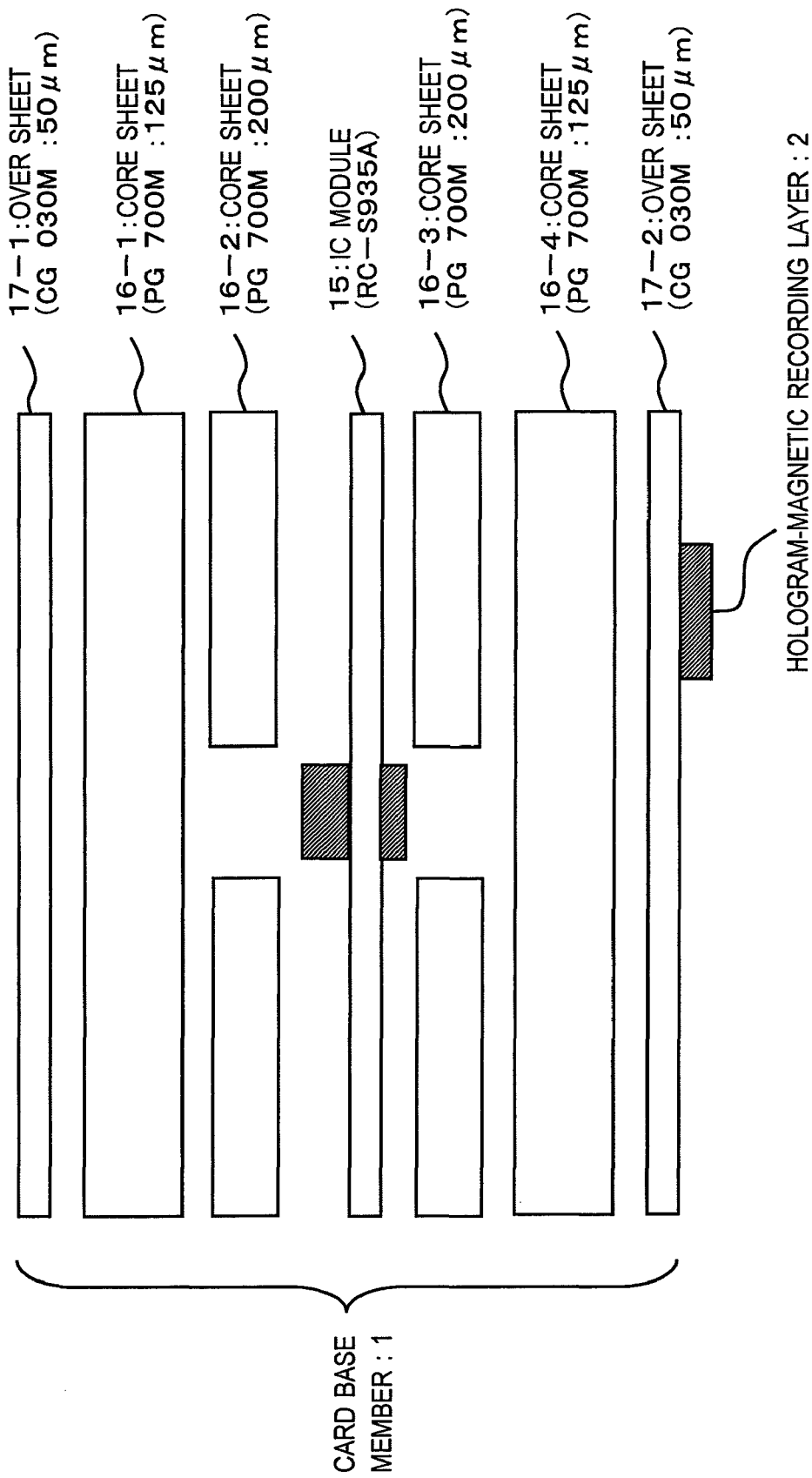
FIG. 7 is a view showing a non-contact type IC card used when measurement results shown in FIGS. 6 and 8 are applied.
Figure 9:
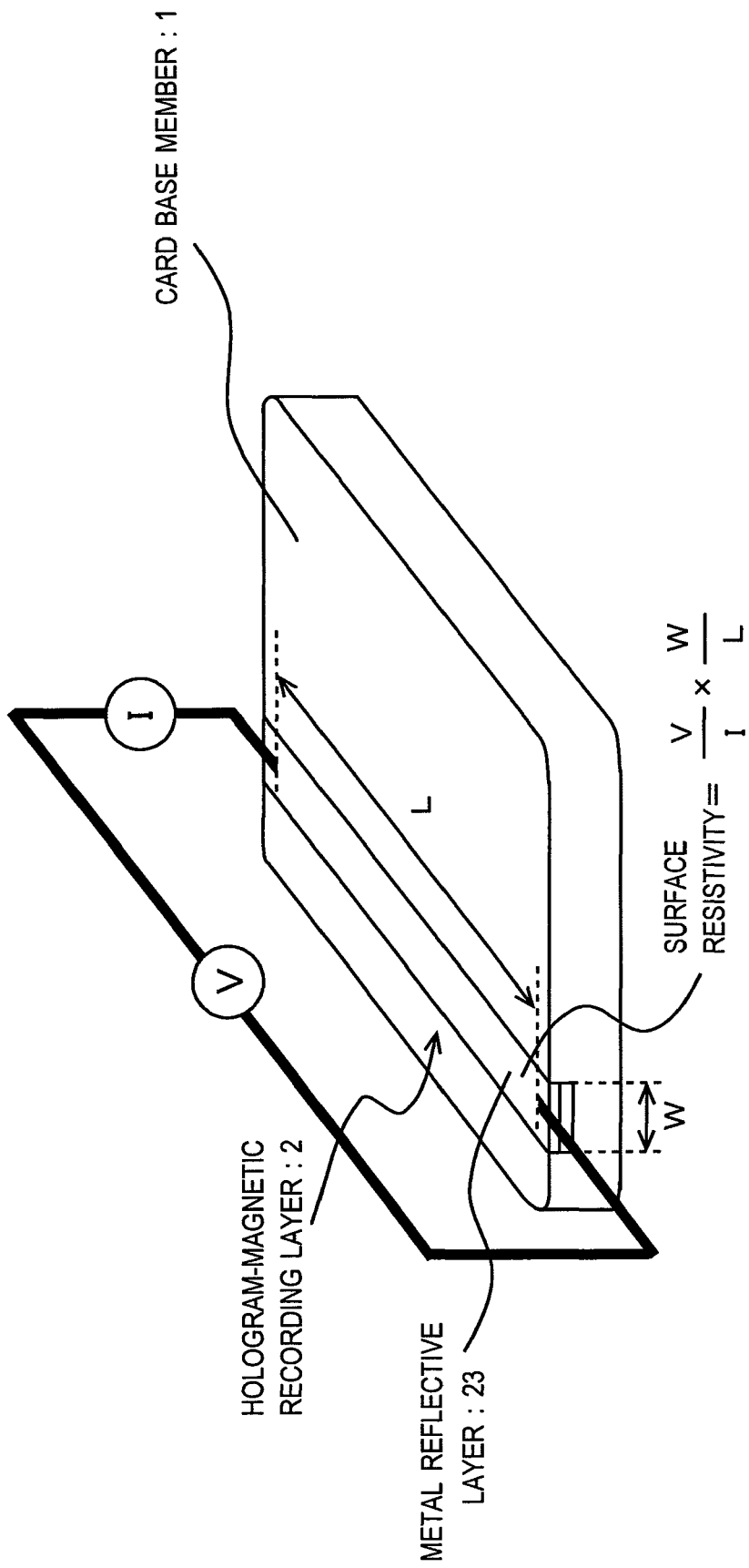
FIG. 9 is a view illustrating a method of measuring the "surface resistivity" shown in FIG. 8.

1 CARD BASE MEMBER
2 HOLOGRAM-MAGNETIC RECORDING LAYER
11 ANTENNA SUBSTRATE
12 ANTENNA PATTERN
13 IC CHIP
14 ADHESIVE
15 IC MODULE
16 CORE SHEET
17 OVER SHEET
21 ADHESION LAYER
22 MAGNETIC RECORDING LAYER
23 METAL REFLECTIVE LAYER
24 HOLOGRAM LAYER
25 PASSIVATION LAYER
26 RELEASE LAYER
27 SUPPORT LAYER
30 HOLOGRAM FORMING PORTION

What is claimed is:

1. A non-contact type IC card in which a hologram-magnetic recording layer comprising at least a magnetic recording layer, a metal reflective layer, and a hologram layer are sequentially laminated on a card base member, and an antenna and an IC chip connected to the antenna are embedded in the card base member,
   wherein the hologram-magnetic recording layer and the antenna overlap each other, and
   wherein the metal reflective layer comprises a material of which electric conductivity is smaller than $28.9 \times 10^6/\Omega m$.

2. The non-contact type IC card according to claim 1, wherein the material is comprises at least one of Sn, Ti, Cr, Fe, In, Ni, Co, and Zn.

3. The non-contact type IC card according to claim 1, wherein the metal reflective layer is composed of a continuous film.

4. The non-contact type IC card according to claim 1, wherein the magnetic recording layer, the metal reflective layer, and the hologram layer are integrated.

5. A non-contact type IC card in which a hologram-magnetic recording layer comprising at least a magnetic recording layer, a metal reflective layer, and a hologram layer are sequentially laminated on a card base member, and an antenna and an IC chip connected to the antenna are embedded in the card base member,
   wherein the hologram-magnetic recording layer and the antenna overlap each other, and
   wherein a surface resistivity of the metal reflective layer is 7.02 ($\Omega/\square$) or more.

6. The non-contact type IC card according to claim 5, wherein the metal reflective layer is composed of a continuous film.

7. The non-contact type IC card according to claim 5, wherein the magnetic recording layer, the metal reflective layer, and the hologram layer are integrated.

* * * * *

UNITED STATES PATENT AND TRADEMARK OFFICE
CERTIFICATE OF CORRECTION

| | | |
|---|---|---|
| PATENT NO. | : 7,931,203 B2 | |
| APPLICATION NO. | : 12/092205 | |
| DATED | : April 26, 2011 | |
| INVENTOR(S) | : M. Fujita et al. | |

It is certified that error appears in the above-identified patent and that said Letters Patent is hereby corrected as shown below:

At column 14, line 24 (claim 2, line 2) of the printed patent, please remove the word "is" after "material".

Signed and Sealed this
Ninth Day of August, 2011

David J. Kappos
*Director of the United States Patent and Trademark Office*